United States Patent [19]

Floyd et al.

[11] 4,398,757

[45] Aug. 16, 1983

[54] LAMINAR FLOW CONNECTOR FOR BLOOD AND STERILE SOLUTIONS

[76] Inventors: Larry K. Floyd, 2720 Almsbury, Brookfield, Wis. 53005; Bert S. Bodnar, 125 Clinton St., Parkridge, Ill. 60068

[21] Appl. No.: 235,689

[22] Filed: Feb. 18, 1981

[51] Int. Cl.³ .............................................. F16L 37/18
[52] U.S. Cl. .................................. 285/315; 285/322; 285/423; 604/905
[58] Field of Search ............... 285/315, 322, 423, 316; 604/93, 905, 408, 283; 128/207.14

[56] References Cited

U.S. PATENT DOCUMENTS

| | | |
|---|---|---|
| 1,647,804 | 11/1927 | Laney . |
| 2,094,147 | 9/1937 | Forsberg . |
| 2,386,562 | 10/1945 | Mahoney . |
| 2,458,722 | 1/1949 | Nesset et al. . |
| 2,784,987 | 3/1957 | Corcoran ..................... 285/315 X |
| 3,476,412 | 11/1969 | Demler ............................ 285/322 |
| 3,484,121 | 12/1969 | Quinton . |
| 3,560,028 | 2/1971 | Ohba . |
| 3,684,321 | 8/1972 | Hundhausen ..................... 285/316 |
| 3,860,268 | 1/1975 | Zeman . |
| 3,884,513 | 5/1975 | Gussert . |
| 3,885,819 | 5/1975 | Egerer et al. . |
| 3,986,508 | 10/1976 | Barrington . |
| 4,019,502 | 4/1977 | Eikins . |
| 4,019,512 | 4/1977 | Tenczar . |
| 4,076,285 | 2/1978 | Martinez . |
| 4,088,349 | 5/1970 | Guest . |
| 4,122,205 | 5/1977 | Tenczar . |
| 4,123,091 | 10/1978 | Cosentino et al. . |
| 4,133,312 | 1/1979 | Burd . |
| 4,214,779 | 7/1980 | Losell . |

FOREIGN PATENT DOCUMENTS 1314816  4/1973  United Kingdom ................ 285/315

Primary Examiner—Dave W. Arola
Attorney, Agent, or Firm—Andrus, Sceales, Starke & Sawall

[57] ABSTRACT

A pair of tubular coupling members (2, 3) are joined in a telescopic relationship to form a continuous passageway (25) of substantially uniform diameter. A plurality of resilient clamping fingers (27) are biased in a radially outward direction and axially extend from one coupling member (3) to surround an annular projection (10) provided by another coupling member (2). A slidable annular locking sleeve (4) removably engages camming surfaces (25) to urge the clamping fingers (22) into firm locking engagement to surround the annular projection (10) and securely maintain the coupling members (2, 3) together. The connector maintains a fluid tight seal without directly subjecting a gasket (12) to the solutions to maintain a sterile connection.

2 Claims, 5 Drawing Figures

LAMINAR FLOW CONNECTOR FOR BLOOD AND STERILE SOLUTIONS

BACKGROUND OF THE INVENTION

This invention relates to a laminar flow connector for conveying blood or other sterile solutions.

Many prior flow connectors have been difficult to sterilize and maintain sterile because the elastic sealing member is directly exposed to the axial passage and therefore comes into direct contact with the fluid being conveyed. Other connectors may provide a sterile coupling but fail to provide a continuous or laminar flow. Some connectors rely strictly on friction and pressure to provide a seal and once in a locked position, they are not easily disengaged. Frequently, connectors are not reusable and must be disposed of after their initial use.

BRIEF SUMMARY OF THE INVENTION

A coupling device for joining two fluid conduits includes a pair of coupling members adapted to be joined in a telescopic relationship and to provide a continuous or laminar flow between the fluid conduits.

An elastic sealing gasket is connected to one of the coupling members to provide a seal at the interface of the two members when they are telescopically joined.

A plurality of resilient clamping fingers extend from the end of one of the coupling members and engage the surface of the other coupling member.

The coupling members are secured in a joined state by sliding a locking sleeve over the clamping fingers, which urges the clamping fingers into contact with the surface of the other coupling member.

The connector provides a continuous or laminar flow and utilizes an elastic seal located remote from the axial fluid carrying passageway in order to avoid direct fluid-seal contact.

The clamping and locking assembly prevents accidental disconnection while facilitating rapid intentional disconnection.

DESCRIPTION OF THE PREFERRED EMBODIMENT

Figure 1:
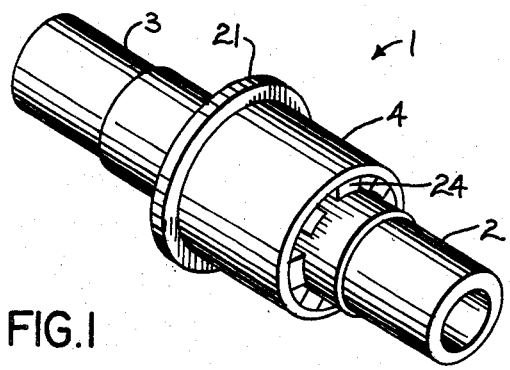
FIG. 1 is a perspective view of a laminar flow connector in a connected condition.

A laminar flow connector 1 consists of a first coupling member 2 retaining a releasably connected gasket or seal 12 and which may be releasably joined with a second coupling member 3 through a locking sleeve 4.

The coupling member 2 includes: a conduit receiving portion 5 that telescopically connects to a fluid conduit 6; a tubular male connector portion 7 that is inserted into second coupling member 3 and has a tubular opening 7a; and an intermediate portion 8 located between conduit receiving portion 5 and male connector portion 7.

The end of intermediate portion 8 nearest male connector portion 7 has an outer diameter greater than that of both male connector portion 7 and intermediate body portion 9. As a result, a locking lip 10 is formed around the end of intermediate portion 8 and an abutment surface 11 is formed at the outer end of male connector portion 7.

An elastic sealing gasket 12 is slidably disposed over male connector portion 7 until gasket 12 abuts surface 11. The length of the gasket 12 is less than that of the male connector portion 7 and thus the end 7b of the connector portion 7 extends beyond the gasket 12 after the gasket 12 has been mounted on the connector portion 7.

The second coupling member 3 includes: a conduit receiving portion 13 that telescopically connects to a second fluid conduit 14; a female connector portion 15 that receives male connector portion 7 and has a tubular opening 15a; and an intermediate portion 16 located between conduit receiving portion 13 and female connector portion 15.

Figure 3:
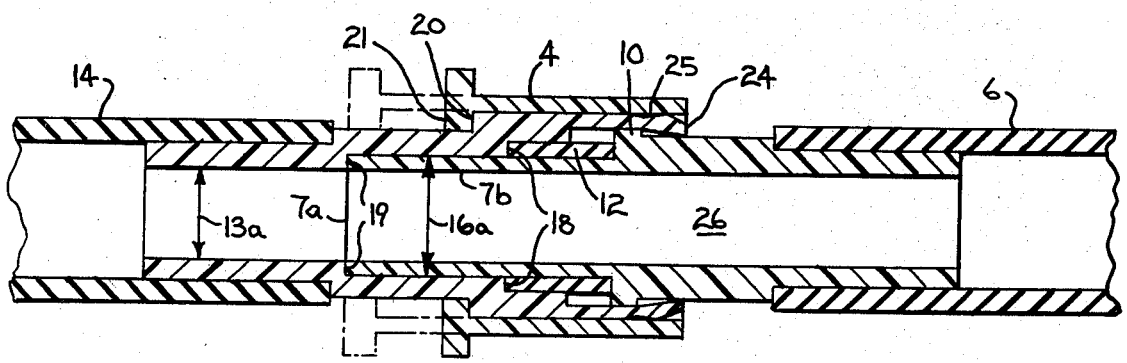
FIG. 3 is a cross-sectional view of the connector taken along line 3—3 in FIG. 1.
Figure 5:
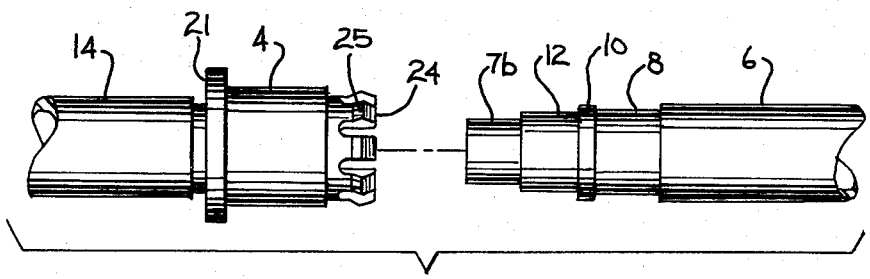
FIG. 5 is a side elevational view of the connector of FIG. 1 in a disconnected condition.

As seen in FIG. 3 the end of intermediate portion 16 nearest female connector portion 15 has an inside diameter 16a smaller than that of female connector portion 15. This results in an inwardly extending shoulder 18 that serves as an abutment for sealing gasket 12 when coupling members 2 and 3 are telescopically joined.

A conduit receiving portion 13 also has a smaller inner diameter 13a than intermediate portion 16, thus forming an abutment shoulder 19 that serves as a stop for male connector portion 7.

Similarly, female connector portion 15 is designed with a larger outer diameter 15b than intermediate portion 16 so as to form a shoulder 20 that serves as a stop for an inwardly extending flange 21 on locking sleeve 4.

Circumferentially spaced around and axially extending from female connector portion 15 are a plurality of resilient clamping fingers 22. Fingers 22 have a base portion 23, a tip portion 24 and a camming surface 25.

In use, coupling members 2 and 3 are telescopically joined to a point where the end of male connector portion 7 abuts shoulder 19 and sealing gasket 14 abuts shoulder 18 forming a smooth laminar flow passageway 26.

Figure 4:
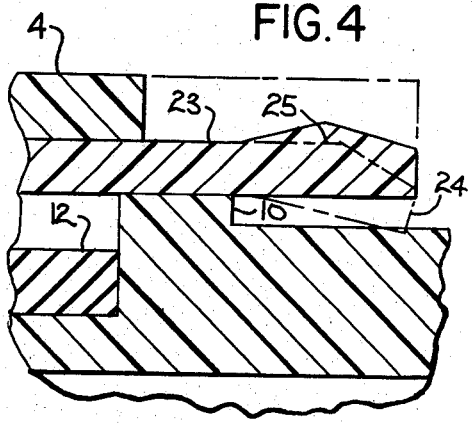
FIG. 4 is a detailed cross-sectional view showing a portion of the connector of FIG. 3.
Figure 2:
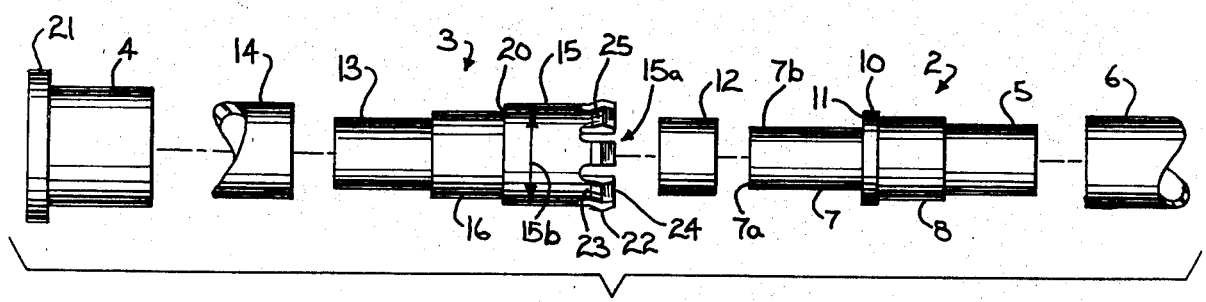
FIG. 2 is an exploded side elevational view of the connector of FIG. 1.

As seen in FIG. 4 in its connected state, tip portions 24 of fingers 22 extend beyond locking lip 10. The locking sleeve 4 is axially moved from its position in FIG. 4 to the left of the fingers 22 to be slid over joined coupling members 2 and 3 to a point where flange 21 abuts shoulder 20. In such condition, sleeve 4 engages camming surfaces 25 which urge tips 24 inward radially to firmly grasp locking lip 10 and engage the surface of intermediate portion 8. The engagement of clamping fingers 22 with lip 10 secures coupling members 2 and 3 in a connected state and prevents their accidental disconnection. However, connector 1 may be readily intentionally disconnected by sliding sleeve 4 out of engagement with fingers 22. Resilient fingers 22 thereby radially move in an outward direction to a position spaced from lip 10 to allow coupling members 2 and 3 to be easily pulled apart.

The releasable connector permits a quick connection and disconnection without any appreciable effort by an operator. When connected, a smooth laminar flow is permitted for the free flow of blood and sterile solutions. The seal or gasket 12 prevents any fluid leakage but yet is maintained in a substantially concealed position between abutments 11 and 18 in a connected condition so that blood or sterile solution will generally not be in contact with such gasket. Such concealment of the gasket 12 thus tends to avoid any contamination of the fluid which might otherwise exit if customary gaskets are directly exposed to such fluid. The construction therefore avoids special sterilization frequently required for customary types of gaskets.

Various modes of carrying out the invention are contemplated as being within the scope of the following claims, particularly pointing out and distinctly claiming the subject matter which is regarded as the invention.

What is claimed is:

1. A laminar flow connector for blood and sterile solutions, comprising first and second coupling members releasably connected to define a coaxial fluid passageway to conduct said solutions, said first coupling member providing a tubular opening of a substantially uniform first diameter and an external circumferential surface of varying diameter including a first surface portion of a first diameter adjacent to a first end and a second surface portion of a second diameter substantially greater than said first diameter and forming an annular projection providing an annular shoulder between said first and second surface portions, an annular seal removably connected to surround said first surface portion of said first member and extending from said annular shoulder to a location spaced from said first end, said second coupling member providing a tubular opening of varying diameter including a first tubular portion with a substantially uniform first diameter and a second tubular portion with a second diameter larger than said first diameter and an annular stop separating said first and second tubular portions with said annular stop removably engaging said first end of said first coupling member to provide a substantially uniform diameter passageway with said first and second members joined together and with said second tubular portion removably engaging in a tight fit said first surface portion of said first member and a third tubular portion with a third diameter larger than said second diameter and forming an annular ledge between said second and third tubular portions to removably engage said seal in a tight fit in a connected position, said second coupling member including a series of circumferentially spaced fingers axially extending to surround said annular projection provided by said first member, with each finger including a radially extending camming surface, and an annular sleeve axially movable along said second member between a first position allowing said fingers to be biased radially outward to permit axial movement between said first and second members and a second position to engage a circumferential surface of said sleeve with said camming surfaces to bias said fingers radially inward to firmly engage said fingers against said annular projection to provide a firm connection between said first and second connectors without directly subjecting said seal to the solutions within said passageway.

2. A laminar flow connector for blood and sterile solutions, comprising first and second coupling members releasably connected to define a coaxial fluid passageway to conduct said solutions, said first coupling member providing a tubular opening of a substantially uniform first diameter and an external circumferential surface of varying diameter including a first surface portion of a first diameter adjacent to a first end and a second surface portion of a second diameter substantially greater than said first diameter and forming an annular projection providing an annular shoulder between said first and second surface portions, an annular seal removably connected to surround said first surface portion of said first member and extending from said annular shoulder to a location spaced from said first end, said second coupling member providing a tubular opening of varying diameter including a first tubular portion with a substantially uniform first diameter and a second tubular portion with a second diameter larger than said first diameter and an annular stop separating said first and second tubular portions with said annular stop removably engaging said first end of said first coupling member to provide a substantially uniform diameter passageway with said first and second members joined together and with said second tubular portion removably engaging in a tight fit said first surface portion of said first member and a third tubular portion with a third diameter larger than said second diameter and forming an annular ledge between said second and third tubular portions to removably engage said seal in a tight fit in a connected position, and means for releasably connecting said first and second members to provide a firm releasable connection between said first and second connectors without directly subjecting said seal to the solutions within said passageway.

* * * * *